United States Patent
Morizane et al.

(10) Patent No.: US 8,518,172 B2
(45) Date of Patent: Aug. 27, 2013

(54) AQUEOUS INORGANIC ZINC-RICH COATING COMPOSITION

(75) Inventors: Toshinori Morizane, Tokyo (JP); Yoshio Yamada, Osaka (JP); Junichi Takagishi, Osaka (JP); Hidenori Matsuno, Tochigi (JP); Masaki Ohshiba, Tochigi (JP)

(73) Assignee: DAI Nippon Toryo Co., Ltd., Osaka (JP)

( * ) Notice: Subject to any disclaimer, the term of this patent is extended or adjusted under 35 U.S.C. 154(b) by 229 days.

(21) Appl. No.: 12/936,237

(22) PCT Filed: Mar. 30, 2009

(86) PCT No.: PCT/JP2009/056500
§ 371 (c)(1),
(2), (4) Date: Oct. 4, 2010

(87) PCT Pub. No.: WO2009/123116
PCT Pub. Date: Oct. 8, 2009

(65) Prior Publication Data
US 2011/0030584 A1    Feb. 10, 2011

(30) Foreign Application Priority Data

Apr. 4, 2008 (JP) ................ 2008-098739

(51) Int. Cl.
*C09D 1/02* (2006.01)
(52) U.S. Cl.
USPC ................... 106/286.6; 106/287.1
(58) Field of Classification Search
None
See application file for complete search history.

(56) References Cited

U.S. PATENT DOCUMENTS

| 5,413,628 | A | * | 5/1995 | Savin | 106/14.44 |
| 5,449,533 | A | | 9/1995 | Morizane | |
| 5,531,822 | A | | 7/1996 | Morizane | |
| 8,048,215 | B2 | * | 11/2011 | Davies et al. | 106/286.2 |

FOREIGN PATENT DOCUMENTS

| JP | 35-8494 | | 7/1960 |
| JP | 47-42726 | | 10/1972 |
| JP | 54-7021 | | 4/1979 |
| JP | 06-256073 | | 9/1994 |
| JP | 11-124520 | | 5/1999 |
| JP | 2004-359800 | | 12/2004 |
| JP | 2005-015835 | | 1/2005 |
| JP | 2005-015836 | | 1/2005 |
| JP | 2005015835 A | * | 1/2005 |
| JP | 2005-066574 | | 3/2005 |

OTHER PUBLICATIONS

Bulletin, 2003.*
International Search Report—PCT/JP2009/056500—Jun. 16, 2009.
CN Office Action dated Feb. 25, 2013, with partial English translation; Application No. 200980112556.7.
Guo Xiaojun et al., "A Study on Waterborne Lithium Silicate Zinc-Rich Coating", Corrosion and Protection, vol. 21, No. 6, p. 274-275; Jun. 2000.

* cited by examiner

*Primary Examiner* — Melvin C Mayes
*Assistant Examiner* — Stefanie Cohen
(74) *Attorney, Agent, or Firm* — Young & Thompson

(57) ABSTRACT

An aqueous inorganic zinc-rich coating composition employs zinc powder and a vehicle containing an aqueous solution containing a specific alkali silicate, an ammonium ion, and a halide ion at specific concentrations; a vehicle containing an aqueous solution containing the above ingredients at specific concentrations and additionally an alkali halide at a specific concentration; or a vehicle containing an aqueous solution containing a specific alkali silicate and an alkali halide at specific concentrations, wherein the vehicle and zinc powder are contained at a specific ratio.

11 Claims, No Drawings

AQUEOUS INORGANIC ZINC-RICH COATING COMPOSITION

TECHNICAL FIELD

The present invention relates to an aqueous inorganic zinc-rich coating composition and, more particularly, to an aqueous inorganic zinc-rich coating composition which employs a highly anticorrosive aqueous inorganic material as a vehicle to thereby realize reduction in VOC level and which can be used as a zinc-rich coating, a zinc shop primer, or a thick-film zinc-rich paint, serving as an anticorrosive undercoating for a heavy-duty coating system.

BACKGROUND ART

Hitherto, zinc-rich coatings, serving as anticorrosive undercoatings for a heavy-duty coating system, are generally categorized into solvent-based inorganic coatings containing an alkyl silicate binder (see, for example, Patent Document 1) and solvent-based organic coatings containing a binder of high polymer resin (e.g., epoxy resin or polystyrene resin) (see, for example, Patent Documents 2 and 3).

At present, reduction in VOC level and saving petroleum resources are global environmental issues which are under discussion on the worldwide scale. Among them, reduction in the amount of organic solvent, which is produced from petroleum and is a source of VOC, is the most critical problem to be solved in the coating/painting industry. According to a guideline of Japan Paint Manufacturers Association, the amount of organic solvent employed in generally used solvent-based coatings should be reduced to 50% of the amount of organic solvent actually used in 2004.

The coating industry has taken the issue seriously and has proceeded with conversion of organic-solvent-based coatings to non-organic-solvent-based coatings such as aqueous coatings and powder coatings, so long as the conversion is technically feasible. In the fields of building construction, automobiles, light electric appliances, general industrial products, etc., most of the coatings used therein have already been converted to those of a non-organic-solvent type.

Generally, such zinc-rich coatings are painted in combination with epoxy undercoating, non-yellowing urethane overcoating, acrylic silicone overcoating, fluorine-containing overcoating, etc. Hitherto, techniques for producing these coatings from aqueous resin have been virtually established, and these coatings exhibit satisfactory performance of a practically employable level. In contrast, for zinc-rich coatings, zinc shop coatings, and the like, no aqueous vehicle providing the coatings with long-term durability has been developed. Thus, conversion of organic-base coatings to aqueous coatings has not been fully accomplished in the fields where heavy-duty zinc-rich coating is required (e.g., bridges, oil tanks, ships, and structures in harbor area).

Needless to say, the performance most required of a zinc-rich coating is provision of a long-term anticorrosive property to steel material. Among aqueous coatings, technically, aqueous organic coatings are more readily produced, and some aqueous coatings for industrial uses have been employed in practice. However, currently employed aqueous organic zinc-rich coatings are unsatisfactory in terms of anticorrosive performance, and great difficulty is encountered in attaining the performance of a zinc-rich coating required for a heavy-duty coating system. Thus, there is demand for an aqueous inorganic coating that is envisaged to exhibit a longer-term anticorrosive performance.

Conventionally, alkali silicate salts and colloidal silica have been studied as typical materials for providing a binder that can be used in an aqueous inorganic coating, and a number of patent applications thereon have been filed. However, even though a number of inventions related thereto have already been patented, unfortunately, no zinc-rich coating that can be used in practice while meeting the demand for long-term anticorrosive coating systems against environmental problems is currently supplied on the market. The reason for this is that the performance of conventionally studied aqueous inorganic zinc-rich coatings has not yet attained the performance level required by the heavy-duty coating system.

When only an alkali silicate salt is employed as a binder, the following problems occur. Specifically, 1: when the alkalinity of the alkali silicate salt is excessively high, reaction between the alkali silicate and zinc powder unavoidably occurs. In this case, the pot life is as short as about 1 to about 3 hours, making handling of the coating difficult. 2: Unevenness in color of the dry coating film and surface blushing of the coating film after exposure to the atmosphere may be problematic. 3: Although the protective potential of zinc is ensured, reaching the potential may require a long period of time. 4: Although the coating exhibits excellent anticorrosive performance in the salt spray test, the stability of the coating is poor. 5: The adhesion of the coating to an epoxy undercoating is variable. 6: When immersed in city water, dissolution, blistering, and peeling of the coating readily occur. The coating cannot be used in a process involving immersion.

Patent Document 1: Japanese Patent Application Laid-Open (kokai) No. 2004-359800
Patent Document 2: Japanese Patent Application Laid-Open (kokai) No. Hei 11-124520
Patent Document 3: Japanese Patent Application Laid-Open (kokai) No. 2005-66574

DISCLOSURE OF THE INVENTION

Problems to be Solved by the Invention

Objects to be attained for aqueous inorganic zinc-rich coatings which can be used in a heavy-duty coating system include stability in mixing with zinc powder, pot life, strength of coating film, over-coatability of epoxy coating, etc., secondary physical properties of the coating system, anticorrosive performance against salt spray, protective potential realization, protective potential maintenance, water insolubility of coating film, and coatability. The important point here is not excellence in individual properties but balance among these properties.

An object of the present invention is to provide an aqueous inorganic zinc-rich coating composition which employs a highly anticorrosive aqueous inorganic material as a vehicle to thereby realize reduction in VOC level and which can be used as a zinc-rich coating, a zinc shop primer, or a thick-film zinc-rich paint, serving as an anticorrosive undercoating for a heavy-duty coating system.

Means for Solving the Problems

The present inventors have carried out extensive studies on the vehicle used in aqueous inorganic zinc-rich coating compositions, and have found that a target aqueous inorganic zinc-rich coating composition can be produced through employing zinc powder and a vehicle comprising an aqueous solution containing a specific alkali silicate, an ammonium ion, and a halide ion at specific concentrations; a vehicle comprising an aqueous solution containing the above ingredients at specific concentrations and additionally an alkali halide at a specific concentration; or a vehicle comprising an aqueous solution containing a specific alkali silicate and an alkali halide at specific concentrations, wherein the vehicle and zinc powder are contained at a specific ratio. The present invention has been accomplished on the basis of this finding.

Accordingly, the present invention provides an aqueous inorganic zinc-rich coating composition, characterized in that the composition comprises a vehicle comprising an aqueous solution containing an alkali silicate represented by formula $M_2O \cdot nSiO_2$ (wherein M represents Na, K, Li, or Cs, and n is an number of 2 to 4) at a concentration of 10 to 50 mass %, an ammonium ion at a concentration of 0.01 to 0.1 M, and a halide ion at a concentration of 0.01 to 1 M, and zinc powder, wherein the composition in the form of dried film contains the vehicle and zinc powder in such amounts that the composition has a binder solid content of 5 to 20 mass %, preferably 5 to 10 mass %, and a zinc powder content of 80 to 95 mass %, preferably 90 to 95 mass %.

Another characteristic feature of the aqueous inorganic zinc-rich coating composition of the present invention resides in that the vehicle further contains an alkali halide in an amount of 0.5 to 13 mass % with respect to the mass of the alkali silicate. In the present invention, "with respect to the mass of the alkali silicate" means "with respect to 100 parts by mass of the alkali silicate compound (i.e., solid content).

The present invention also provides an aqueous inorganic zinc-rich coating composition, characterized in that the composition comprises a vehicle comprising an aqueous solution containing an alkali silicate represented by formula $M_2O \cdot nSiO_2$ (wherein M represents Na, K, Li, or Cs, and n is an number of 2 to 4) at a concentration of 10 to 50 mass % and an alkali halide in an amount of 0.5 to 13 mass % with respect to the mass of the alkali silicate, and zinc powder, wherein the composition in the form of dried film contains the vehicle and zinc powder in such amounts that the composition has a binder solid content of 5 to 20 mass %, preferably 5 to 10 mass %, and a zinc powder content of 80 to 95 mass %, preferably 90 to 95 mass %.

In the aqueous inorganic zinc-rich coating composition of the present invention, the vehicle may comprise a neutralization product of the above vehicle formed through partially neutralizing alkali silicate with an inorganic acid in an amount of 0.5 to 4.5 mass % with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass % with respect to the mass of the alkali silicate. Alternatively, the vehicle may comprise the above ingredients and additionally a water-soluble polyhydric alcohol in an amount of 1 to 35 mass % with respect to the mass of the alkali silicate. Further alternatively, the vehicle may further contain a pigment, wherein the composition in the form of dried film contains the vehicle and the pigment in such amounts that the composition has a binder solid content of 5 to 15 mass %, a pigment content of 5 to 55 mass %, and a zinc powder content of 40 to 90 mass %.

Effects of the Invention

The aqueous inorganic zinc-rich coating composition of the present invention employs a highly anticorrosive aqueous inorganic material as a vehicle to thereby realize reduction in VOC level and thus can be used as a zinc-rich coating, a zinc shop primer, or a thick-film zinc-rich paint, serving as an anticorrosive undercoating for a heavy-duty coating system.

BEST MODES FOR CARRYING OUT THE INVENTION

In the present invention, an alkali silicate represented by formula $M_2O \cdot nSiO_2$ (wherein M represents Na, K, Li, or Cs, and n is an number of 2 to 4, the number may or may not be an integer) is employed as a vehicle. When the alkalinity of the alkali silicate is high, the aqueous inorganic zinc-rich coating composition tends to have poor stability. Thus, the number n is preferably 2.5 to 4. In the present invention, an aqueous solution containing the alkali silicate represented by the formula at a concentration of 10 to 50 mass %, preferably 15 to 40 mass %, is preferably used. When the concentration is less than 10 mass %, even in the case where the dried coating film of the composition has a minimum binder solid content of 5 mass %, the amount of vehicle to be mixed with zinc powder increases, resulting in an excessive drop in viscosity of the coating. In this case, stability against precipitation is likely to be impaired. When the concentration is in excess of 50 mass %, the viscosity of the vehicle excessively increases. In this case, mixing of ingredients (e.g., pigments) and zinc powder is likely to be impeded.

In a first embodiment of the present invention, in order to ensure balance in performance of the zinc-rich coating, an ammonium ion serving as an activating agent and a halide ion serving as a catalyst are preferably incorporated at concentrations of 0.01 to 0.1 M and 0.01 to 1 M, respectively into the aqueous solution containing alkali silicate. Such an aqueous solution is disclosed in, for example, Japanese Patent Publication Hei 7-10750. Through incorporation of ammonium ions and halide ions into the aqueous solution, the rate of reaction of the vehicle and zinc powder during mixing the two ingredients is retarded, to thereby ensure a pot life as long as about 5 hours and stabilize adhesion to epoxy resin undercoating.

The source of ammonium ions is preferably an inorganic salt such as ammonium chloride or ammonium fluoride. Of these, ammonium chloride is particularly preferred. When the vehicle has an ammonium ion concentration less than 0.01 M, the effect of the added activating agent tends to be insufficient, whereas when the vehicle has an ammonium ion concentration in excess of 0.1 M, gelling of the mixture with zinc powder is accelerated during mixing, thereby shortening the pot life. In such a case, the obtained coating is not suited for use in practice.

The halide ion serving as a catalyst is preferably chloride ion or fluoride ion. Of these, chloride ion is particularly preferred. The source of halide ions is preferably a chloride or fluoride of a metal (e.g., Na, K, Ca, Al, or Mg). Of these, Na salts are particularly preferred. When the vehicle has a halide ion concentration less than 0.01 M, the time required to attain protective potential is likely to be prolonged, impairing the effect of the added catalyst. In this case, the object of the present invention cannot be fully attained. When the vehicle has a halide ion concentration in excess of 1 M, the vehicle is likely to have poor stability, thereby decreasing the water resistance of the dried coating film obtained from the composition.

Preferably, the vehicle employed in the invention contains, for example, an ammonium halide at a concentration of 0.05 M and an alkali halide at a concentration of 0.1 M. Such a vehicle as is may be used, or may further contain additional alkali halide in accordance with need. The total alkali halide after addition is preferably such that the vehicle contains an alkali halide in an amount of 0.5 to 13 mass %, preferably 1 to 12 mass %, with respect to the mass of the alkali silicate. In this case, the rate of reaction of the vehicle and zinc powder during mixing the two ingredients is retarded, to thereby ensure a pot life as long as about 5 hours, attain protective potential within a short period of time, stabilize performance against salt spray and adhesion with epoxy undercoating, and enhance secondary performance of the obtained dry coating film. Notably, the mean particle size of zinc powder is preferably large, specifically 5 to 8 μm.

In a second embodiment of the present invention, in order to ensure balance in performance of the zinc-rich coating, an alkali halide is preferably incorporated into the aqueous solution containing alkali silicate in an amount of 0.5 to 13 mass %, preferably 1 to 12 mass %, with respect to the mass of the alkali silicate. Through incorporation of the alkali halide, the rate of reaction of the vehicle and zinc powder during mixing the two ingredients is retarded, to thereby ensure a pot life as long as about 5 hours, attain protective potential within a short period of time, stabilize performance against salt spray and adhesion with epoxy undercoating, and enhance secondary performance of the obtained dry coating film.

When the amount of alkali halide in the vehicle with respect to the mass of the alkali silicate is less than 0.5 mass %, the effect of added alkali halide tends to be insufficient, whereas when the amount is in excess of 13 mass %, the surface of the obtained dry coating film has unevenness in color, and blushing may occur upon exposure to the atmosphere, which are not preferred.

In a third embodiment of the present invention, in order to ensure balance in performance of the zinc-rich coating, a water-soluble polyhydric alcohol is preferably incorporated into any of the aforementioned vehicle in an amount of 1 to 35 mass %, preferably 1 to 30 mass %, with respect to the mass of the alkali silicate. Through incorporation of the water-soluble polyhydric alcohol, the rate of reaction of the vehicle and zinc powder during mixing the two ingredients is retarded, to thereby ensure a pot life as long as about 5 hours, attain protective potential within a short period of time, and stabilize performance against salt spray and adhesion with epoxy undercoating. Although the secondary performance of the obtained dry coating film is slightly impaired, the film can be used in practice without any problem. Unevenness in color of the surface of the obtained dry coating film can be suppressed, but blushing cannot be prevented upon continuous exposure to the atmosphere.

Examples of the water-soluble polyhydric alcohol employed in the invention include glycerin, ethylene glycol, and di- to polyethylene glycol having a molecular weight of 2,000 or less. When the vehicle has a water-soluble polyhydric alcohol content less than 1 mass % with respect to the mass of the alkali silicate, protective potential is not likely to be fully attained, whereas when the alcohol content is in excess of 35 mass %, the surface of the dry coating film tends to be cracked. Both cases are not preferred.

In a fourth embodiment of the present invention, in order to ensure balance in performance of the zinc-rich coating, there are preferably incorporated, into any of the aforementioned vehicles, a neutralization product of the above vehicle formed through partially neutralizing alkali silicate with an inorganic acid in an amount of 0.5 to 4.5 mass %, preferably 0.8 to 4 mass %, with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass %, preferably 0.7 to 3.2 mass %, with respect to the mass of the alkali silicate. Through incorporation of these additional ingredients, the rate of reaction of the vehicle and zinc powder during mixing the two ingredients is retarded, to thereby ensure a pot life as long as about 5 hours, attain protective potential within a short period of time, stabilize performance against salt spray and adhesion with epoxy undercoating, enhance secondary performance of the obtained dry coating film, suppress unevenness in color of the surface of the obtained dry coating film, and prevent blushing upon continuous exposure to the atmosphere.

Examples of the inorganic acid which may be used in the invention include hydrohalogenic acids such as hydrochloric acid, hydrofluoric acid, and hydrobromic acid; sulfuric acid; and nitric acid. Among them, a hydrohalogenic acid, particularly, hydrochloric acid, is preferably employed. When hydrochloric acid is used, sodium chloride (NaCl) is formed through neutralization. As disclosed in Japanese Patent Application Laid-Open (kokai) No. 2005-15836 (paragraphs 0026 to 0030), NaCl helps formation of a stable complex salt with $M_2O.nSiO_2$ (alkali silicate) on the zinc powder surface during completion of substitution according to ionization tendency.

Theoretically, the reaction proceeds as follows. Zinc species such as Zn (zinc powder), $[Zn(OH)_4]^{2-}$, or $[Zn(OH)_4(H_2O)_2]^{2-}$ (white rust) accomplishes substitution according to ionization tendency in the presence of $M_2O.nSiO_2$ (alkali silicate), and NaCl formed through neutralization forms therewith a stable complex salt. The reaction scheme is as follows.

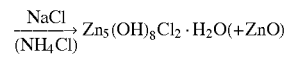

$$\xrightarrow[\text{(NH}_4\text{Cl)}]{\text{NaCl}} Zn_5(OH)_8Cl_2 \cdot H_2O(+ZnO) \qquad [F1]$$

As described above, NaCl reacts with zinc powder, to form, on the surface of zinc power, a hardly soluble salt of basic zinc chloride hydrate $Zn_5(OH)_8Cl_2.H_2O$, saving consumption of zinc powder under corrosive conditions, which is a secondary advantageous effect.

In neutralization of aqueous alkali silicate solution with inorganic acid, when the amount of inorganic acid with respect to the mass of the alkali silicate is less than 0.5 mass %, protective potential is not fully attained, whereas when the amount is in excess of 3.5 mass %, aqueous alkali silicate solution becomes sol or gel. Both cases are not preferred. When the vehicle has a neutralized polyacrylic acid solid content less than 0.5 mass % with respect to the mass of the alkali silicate, the effect of neutralization with hydrochloric acid on prevention of reducing the cohesive force of coating film is insufficient, whereas when the content is in excess of 3.5 mass %, the viscosity of the vehicle excessively increases. In this case, mixing of the vehicle and zinc powder is likely to be impeded, and water resistance of the coating film tends to be reduced. Both cases are not preferred.

In the aqueous inorganic zinc-rich coating composition of the present invention, the composition in the form of dried film contains the vehicle and zinc powder in such amounts that the composition has a binder solid content of 5 to 20 mass %, preferably 5 to 10 mass %, and a zinc powder content of 80 to 95 mass %, preferably 90 to 95 mass %. When the binder solid content is less than 5 mass %, difficulty is encountered in mixing the vehicle with zinc powder, and zinc powder in the liquid mixture tends to precipitate within a short period of time due to presence of a small amount of a binding component even under water-diluted conditions, which is not preferred. Furthermore, since the absolute amount of binder is insufficient, mixing of the vehicle and zinc powder is impeded, and cohesive force of the coating film decreases, thereby failing to form durable coating film. When the binder solid content is in excess of 20 mass %, the relative zinc powder amount is reduced, thereby failing to form zinc-rich coating.

In a fifth embodiment of the present invention, at least one pigment selected from among color pigments such as titanium oxide, iron oxide, and aqueous aluminum paste; extender pigments such as talc, barium sulfate, calcium carbonate, kaolin, and soft silica stone powder; and anticorrosive pigments such as zinc phosphate and aluminum phosphate may be incorporated into the composition. The amount of the pigment is preferably such that the composition in the form of dried film has a binder solid content of 5 to 15 mass %, a pigment content of 5 to 55 mass %, and a zinc powder content of 40 to 90 mass %.

To the aqueous inorganic zinc-rich coating composition of the present invention, a variety of conventional additives (e.g., sag-preventing agent) employed in zinc-rich coating compositions may be incorporated.

EXAMPLES

The present invention will next be described in detail by way of Examples and Comparative Examples, which should not be construed as limiting the invention thereto. Unless otherwise specified, the units "part(s)" and "%" in the Examples and Comparative Examples are mass basis.

The following materials were used in the Examples and Comparative Examples.

<Alkali Silicate Liquid>

An aqueous alkali solution disclosed in Japanese Patent Publication Hei 7-10750 (Claim 1), specifically, an aqueous sodium silicate solution containing ammonium chloride (0.05 M), sodium chloride (0.1 M), and alkali silicate $Na_2O \cdot 3SiO_2$ (45 mass %, solid content).

<No. 3 Sodium Silicate Liquid>

Commercial No. 3 sodium silicate aqueous solution containing compound $Na_2O \cdot 3SiO_2$ (40 mass %, solid content)

<Industrial Salt>

Industrial salt having an NaCl content of 99.5%.

<1M HCl Liquid>

Aqueous solution containing HCl (36.5 g) in city water (1 L).

<2.8% Aqueous ASE-60 Solution>

Viscous transparent liquid produced through 10-fold diluting Primal ASE-60 (product of Rohm & Haas, solid content: 28%) with city water, and neutralizing with 1N NaOH <Purified Glycerin>

Purified glycerin (product of Sakamoto Yakuhin Kogyo Co., Ltd.)

<Polyethylene Glycol>

Polyethylene glycol (molecular weight: 2,000) (product of Sigma Aldrich Japan) (dissolved in hot water to concentration of 10%, and cooled to ambient temperature, the amount of hot water being included in the city water)

<Zinc Powder F-500, Particle Size: 7 to 8 μm>

Standard zinc powder (product of Honjo Chemicl Corporation)

<Titanium Oxide>

Rutile-type titanium oxide color pigment (Taipake CR-50, product of Ishihara Sangyo Kaisha, Ltd.

<Iron Oxide (Red Iron Oxide)>

Red iron oxide color pigment (Toda Color 130ED, product of Toda Pigment)

<Aluminum Phosphate>

Aluminum phosphate-based anticorrosive pigment (K-White #84, product of Tayca Corporation)

<Precipitated Barium Sulfate>

Precipitated barium sulfate L-100 extender pigment (product of Sakai Chemical Industry Co., Ltd.)

Examples 1 to 8 and Comparative Examples 1 to 6

In Examples 1 to 6 and Comparative Examples 1 to 6, materials shown in Table 1 other than zinc powder were used in respective amounts (parts by mass) specified in Table 1, and each mixture was mixed by means of an agitator. Subsequently, the mixture was mixed with zinc powder in an amount (parts by mass) specified in Table 1 by means of an agitator, to thereby produce a zinc-rich coating composition.

In Examples 7 and 8, materials shown in Table 1 other than zinc powder were used in respective amounts (parts by mass) specified in Table 1, and each mixture was kneaded by means of a beads mill, to thereby produce a crushed powder having a particle size, as defined by method A of JIS K 5600, of about 60μ. Subsequently, the powder was mixed with zinc powder in an amount (parts by mass) specified in Table 1 by means of an agitator, to thereby produce a zinc-rich coating composition.

Table 1 also shows the percentages (%) of materials contained in the vehicles with respect to alkali silicate (i.e., parts by mass of each material with respect to 100 parts by mass of alkali silicate compound (solid content)), as well as calculated zinc powder contents, binder solid contents, and pigment contents of dry coating films.

Each of the zinc-rich coating compositions of Examples 1 to 8 and Comparative Examples 1 to 6 was mixed with zinc powder, and the state of the mixture immediately after mixing was evaluated. From the thus-obtained mixture, test plates were produced in the following manner, and the test plates were tested. The results are shown in Table 2.

<Mixing/Filtration Performance>

Evaluation was carried out on whether or not a uniform liquid mixture is readily formed through mixing each vehicle and zinc powder by means of an agitator. Also, an evaluation was made on whether or not the mixture does not cause separation 60 minutes after the formation thereof and can be readily filtered by means of an 80-mesh stainless steel gauze without leaving a residue on the gauze. The evaluation was based on the following ratings.

Pass (O): the case where a uniform liquid mixture was readily formed through mixing each vehicle and zinc powder by means of an agitator; and the mixture caused no separation 60 minutes after the formation thereof and was able to be readily filtered by means of an 80-mesh stainless steel gauze without leaving a residue on the gauze.

Fail (X): the case where mixing of each vehicle and zinc powder required a long time, or separation occurred within 60 minutes; the mixture was difficult to filter by means of a 80-mesh stainless steel gauze; a residue remained on the gauze; or a like phenomenon occurred (failing to attain practical utility).

<Production of Test Plates>

Each of the zinc-rich coating compositions of Examples 1 to 8 and Comparative Examples 1 to 6 was applied through air-spraying to a sand-blasted steel plate (70×150×2.3 mm) to a coating thickness at dryness 60 to 80 μm, to thereby produce a test plate.

The evaluated properties, details of the tests, and ratings for evaluation are as follows.

<Blushing, Color Unevenness, and Cracks in Dry Coating Film>

Each coating was applied through air-spraying to a sand-blasted steel plate, and the plate was dried in-doors for three days. Through visual observation of the surface of the coating film, the presence of blushing or color unevenness was checked. The presence of cracks in the coating film was checked through observation under a magnifying lens (×30). The following ratings were employed.

5: No color unevenness or cracks in the surface of the dry coating film.

4: Partially blushed, but no cracks in the coating film.

3: Presence of blushing or color unevenness in ≦20% area of the test plate, but no cracks in the coating film.

2: Presence of blushing or color unevenness in about 50% area of the test plate, and cracks in the coating film observed under a magnifying lens (×30).

1: Presence of blushing or color unevenness in ≧50% area of the test plate, and cracks in the coating film visually observed.

<Blushing, Color Unevenness, and Cracks in Dry Coating Film after Outdoor Exposure>

Each coating was applied through air-spraying to a sand-blasted steel plate, and the plate was dried in-doors for three days. Subsequently, the plate was subjected to outdoor exposure for seven days. Through visual observation of the surface of the coating film, the presence of blushing or color unevenness was checked. The presence of cracks in the coating film was checked through observation under a magnifying lens (×30). The following ratings were employed.

5: No color unevenness or cracks in the surface of the dry coating film.

4: Partially blushed, but no cracks in the coating film.

3: Presence of blushing or color unevenness in ≦20% area of the test plate, but no cracks in the coating film.

2: Presence of blushing or color unevenness in about 50% area of the test plate, and cracks in the coating film observed under a magnifying lens (×30).

1: Presence of blushing or color unevenness in ≧50% area of the test plate, and cracks in the coating film visually observed.

<Protective Potential>

The test was carried out only for the zinc-rich coating compositions providing a zinc powder content of dry coating film of 90% or more.

Each of the tested coating compositions was applied through air-spraying to a sand-blasted steel plate, and the plate was dried for seven days. The backside and edges of the plate were thoroughly coated with an epoxy coating, and the coated steel plate was dried in-doors for seven days. The plate was immersed in 3% aqueous NaCl for 250 hours, and then the natural potential was measured through a simplified method. Specifically, a portion of the coating film formed on the backside of the test plate was peeled off from the plate, and probes were attached to the backside. A gauze piece (2 cm$^2$) impregnated with 3% aqueous NaCl was placed on the surface of the test plate, and an Ag/AgCl electrode was brought into light contact with the surface via a DC volt meter. The voltage indicated by the voltmeter was read and evaluated on the basis of the following ratings. A rating of 4 or higher was regarded as "practically employable."

5: −950 mV or lower

4: higher than −950 mV, and −800 mV or lower

3: higher than −800 mV, and −650 my or lower

2: higher than −650 mV, and −500 mV or lower

1: higher than −500 mV

<Salt Spray Test>

Each coating was applied through air-spraying to a sand-blasted steel plate, and the plate was dried for seven days. The test plate was subjected to the salt spray test (JIS K 5600) for 250 hours. Rust, blistering, and dissolution of the coating film were evaluated on the basis of the following ratings. A rating of 4 or higher was regarded as "practically employable."

Ratings for Rust Evaluation:

5: No red iron rust occurring in cross-cut areas or non-cross-cut areas.

4: Red iron rust in a part of cross-cut areas, but no expansion of the rust with lapse of the test time.

3: Red iron rust occurring in the entire cross-cut areas.

2: Red iron rust occurring in cross-cut areas and non-cross-cut areas.

1: Red iron rust occurring on ≧20% of the test plate.

Ratings for Blistering and Dissolution Evaluation:

5: No blistering in the coating film or no dissolution of the coating film.

4: Blistering observed in about 10% of the coating film, but no dissolution even under rubbing.

3: Blistering observed in about 40% of the coating film, and staining by the coating under rubbing.

2: Blistering observed in about 60% of the coating film, and a part of the undercoating exposed.

1: Blistering observed in ≧80% of the coating film, and the undercoating exposed through dissolution of the coating film.

<Solvent-Type Epoxy Undercoating (Bridge Standard) Adaptability Test>

Each coating was applied through air-spraying to a sand-blasted steel plate, and the plate was dried for seven days. Then, an epoxy undercoating (Eponix #30, undercoating, product of Dai Nippon Toryo Co., Ltd.) and an epoxy middle coating (V Top H, middle coating, product of Dai Nippon Toryo Co., Ltd.), which are products meeting the bridge standards, were sequentially applied by means of a brush in predetermined coating amounts at an interval of 24 hours. Seven days after application of the middle coating, the adhesion test was performed. In the adhesion test, a test portion of the surface was lightly roughened by use of abrasive paper (#240), and an epoxy adhesive was applied to the test portion. An attachment (diameter: 2 cm) for tensile testing was affixed to the test portion and dried for two days. Subsequently, a portion of the coating film surrounding the attachment was scraped to form a groove. The test portion was peeled by means of an adhesion tensile tester, and the load at which the attachment was peeled off was measured. The adhesive force was evaluated on the basis of the following ratings. A rating of 4 or higher was regarded as "practically employable."

5: Adhesion force of ≧2.0 MPa

4: Adhesion force of ≧1.5 MPa and <2.0 MPa

3: Adhesion force of ≧1.0 MPa and <1.5 MPa

2: Adhesion force of ≧0.5 MPa and <1.0 MPa

1: Adhesion force of <0.5 MPa

<Secondary Physical Properties of Film Formed of Solvent-Type Epoxy Undercoating/Middle Coating (Bridge Standard)>

After completion of the above adhesion test, the test plate was immersed in city water for 14 days. Thereafter, the plate was subjected to the secondary adhesion test through the lattice pattern cutting test (2×2 mm). The secondary adhesion was evaluated on the basis of the following ratings. A rating of 4 or higher was regarded as "practically employable."

5: Lattice pattern adhesion score of 25/25

4: Lattice pattern adhesion score of ≧20/25 and <25/25

3: Lattice pattern adhesion score of ≧15/25 and <20/25

2: Lattice pattern adhesion score of ≧10/25 and <15/25

1: Lattice pattern adhesion score of <10/25

<Pot Life>
<Mixing & Filtration Performance after Allowing the Coating to Stand Five Hours>

Each vehicle was mixed with zinc powder by means of an agitator, and the mixture was allowed to stand for five hours. Thereafter, the liquid mixture was observed to check the presence of precipitates and separation which may impede agitation. Also, the liquid mixture was filtered by means of an 80-mesh stainless steel gauze, and the filtration performance was evaluated on the basis of the following ratings.

Pass (O): The case where the liquid mixture was able to be readily agitated even though separation or precipitation occurred in the liquid mixture after allowing it to stand for five hours, and also the liquid mixture was able to be filtered.

Fail (X): The case where the liquid mixture was not able to be agitated due to separation or precipitation having occurred in the liquid mixture after allowing it to stand for five hours, and also the liquid mixture was not able to be readily filtered, with a large amount of matter remaining on the metal gauze (failing to attain practical utility).

Each vehicle was mixed with zinc powder by means of an agitator, and the mixture was allowed to stand for five hours. The mixture was filtered by means of a 80-mesh stainless steel gauze. The thus-yielded aqueous inorganic zinc-rich coating composition was evaluated in the same manner in terms of <Mixing/filtration performance>, <Blushing, color unevenness, and cracks in dry coating film>, <Blushing, color unevenness, and cracks in dry coating film after outdoor exposure>, <Protective potential>, <Salt spray test>, <Solvent-type epoxy undercoating (bridge standard) adaptability test>, and <Secondary physical properties of film formed of solvent-type epoxy undercoating/middle coating (bridge standard)>. Table 3 shows the results.

TABLE 1

| Zinc-rich coating composition (parts) | Ex. 1 | Comp. Ex. 1 | Ex. 2 | Comp. Ex. 2 | Ex. 3 | Comp. Ex. 3 | Ex. 4 | Comp. Ex. 4 | Ex. 5 | Comp. Ex. 5 | Ex. 6 | Comp. Ex. 6 | Ex. 7 | Ex. 8 |
|---|---|---|---|---|---|---|---|---|---|---|---|---|---|---|
| Alkali silicate liquid | 10.5 | — | — | 14 | 13.5 | 18 | — | — | — | — | 10 | 8 | — | 13.5 |
| No. 3 Na silicate liquid | — | 15 | 17 | — | — | — | 12 | 8 | 10 | 18 | — | — | 13.5 | — |
| Industrial salt | — | — | 0.8 | 0.8 | — | 0.3 | 0.14 | — | 0.12 | — | — | — | — | — |
| 1M HCl | — | — | — | — | — | — | — | — | 4.2 | 1.5 | 1.5 | 4.6 | 6 | 1.6 |
| 2.8% aqueous ASE-60 | — | — | — | — | — | — | — | — | 4.5 | 9.5 | 1.2 | 0.7 | 5 | 1.6 |
| Purified glycerin | — | — | — | — | 1.7 | 3.06 | — | — | — | — | — | — | — | — |
| Polyethylene glycol | — | — | — | — | — | — | 0.08 | 1.3 | — | — | — | — | — | — |
| Titanium oxide | — | — | — | — | — | — | — | — | — | — | — | — | 4 | 4 |
| Iron oxide (red iron oxide) | — | — | — | — | — | — | — | — | — | — | — | — | 1.5 | 1.5 |
| Al phosphate | — | — | — | — | — | — | — | — | — | — | — | — | 4 | 4 |
| Precipitated Ba sulfate | — | — | — | — | — | — | — | — | — | — | — | — | 22 | 10 |
| City water | 14.5 | 10 | 7.2 | 10.2 | 9.8 | 3.64 | 12.78 | 15.7 | 6.18 | 1 | 12.3 | 11.7 | 4 | 8.8 |
| Zn powder F-500 | 75 | 75 | 75 | 75 | 75 | 75 | 75 | 75 | 75 | 70 | 75 | 75 | 40 | 55 |

| % vs alkali silicate | Ex. 1 | Comp. Ex. 1 | Ex. 2 | Comp. Ex. 2 | Ex. 3 | Comp. Ex. 3 | Ex. 4 | Comp. Ex. 4 | Ex. 5 | Comp. Ex. 5 | Ex. 6 | Comp. Ex. 6 | Ex. 7 | Ex. 8 |
|---|---|---|---|---|---|---|---|---|---|---|---|---|---|---|
| NaCl (including NaCl intrinsically in raw material) | 1.29 | — | 11.76 | 14.00 | 1.30 | 5.00 | 2.92 | — | 3.00 | — | 1.29 | 1.31 | — | 1.30 |
| HCl | — | — | — | — | — | — | — | — | 3.83 | 0.76 | 1.22 | 4.66 | 4.06 | 0.96 |
| ASE-60 solid content | — | — | — | — | — | — | — | — | 3.15 | 3.69 | 0.75 | 0.54 | 2.59 | 0.74 |
| Glycerin | — | — | — | — | 27.98 | 37.78 | — | — | — | — | — | — | — | — |
| Polyethylene glycol | — | — | — | — | — | — | 1.67 | 40.63 | — | — | — | — | — | — |
| Zn powder content in dry coating film (%) | 94.1 | 92.6 | 90.8 | 91.3 | 90.5 | 89.8 | 93.2 | 95.7 | 94.7 | 90.3 | 94.1 | 95.2 | 51.8 | 68.2 |
| Binder content in dry coating film (%) | 5.9 | 7.4 | 9.2 | 8.7 | 9.5 | 10.2 | 6.8 | 4.3 | 5.3 | 9.7 | 5.9 | 4.8 | 7.5 | 7.7 |
| Pigment content in dry coating film (%) | — | — | — | — | — | — | — | — | — | — | — | — | 40.8 | 24.1 |

TABLE 2

(Test plates produced immediately after mixing with Zn powder)

| | Ex. 1 | Comp. Ex. 1 | Ex. 2 | Comp. Ex. 2 | Ex. 3 | Comp. Ex. 3 | Ex. 4 | Comp. Ex. 4 | Ex. 5 | Comp. Ex. 5 | Ex. 6 | Comp. Ex. 6 | Ex. 7 | Ex. 8 |
|---|---|---|---|---|---|---|---|---|---|---|---|---|---|---|
| Mixing/filtration performance | O | O | O | O | O | X | O | O | O | O | O | O | O | O |
| Blushing, color unevenness, and cracks in dry coating film | 3 | 3 | 4 | 2 | 5 | — | 5 | 5 | 5 | 5 | 5 | 5 | 5 | 5 |
| Blushing, color unevenness, and cracks in dry coating film after outdoor exposure | 3 | 3 | 3 | 2 | 4 | — | 4 | 4 | 5 | 4 | 5 | 4 | 5 | 5 |

TABLE 2-continued

| | | | | | | | | | | | | | | |
|---|---|---|---|---|---|---|---|---|---|---|---|---|---|---|
| Protective potential | 4 | 3 | 5 | 3 | 5 | — | 5 | 5 | 5 | 5 | 5 | 5 | — | — |
| Salt spray test — Rust | 4 | 3 | 5 | 3 | 5 | — | 5 | 5 | 5 | 5 | 5 | 5 | 4 | 4 |
| Salt spray test — Blistering, dissolution | 5 | 5 | 5 | 5 | 4 | — | 5 | 5 | 5 | 3 | 5 | 3 | 5 | 5 |
| Adhesion to solvent-type epoxy undercoating (bridge standard) | 4 | 3 | 5 | 4 | 4 | — | 5 | 2 | 5 | 3 | 5 | 2 | 5 | 5 |
| Secondary physical properties of film formed of solvent-type epoxy undercoating/middle coating (bridge standard) | 4 | 3 | 5 | 3 | 4 | — | 4 | 3 | 5 | 2 | 5 | 4 | 5 | 5 |

TABLE 3

(Test plates produced five hours after mixing with Zn powder)

| | Ex. 1 | Comp. Ex. 1 | Ex. 2 | Comp. Ex. 2 | Ex. 3 | Comp. Ex. 3 | Ex. 4 | Comp. Ex. 4 | Ex. 5 | Comp. Ex. 5 | Ex. 6 | Comp. Ex. 6 | Ex. 7 | Ex. 8 |
|---|---|---|---|---|---|---|---|---|---|---|---|---|---|---|
| Mixing/filtration performance | ○ | X | ○ | ○ | ○ | X | ○ | ○ | ○ | ○ | ○ | X | ○ | ○ |
| Blushing, color unevenness, and cracks in dry coating film | 3 | — | 4 | 2 | 5 | — | 5 | 5 | 5 | 5 | 5 | — | 5 | 5 |
| Blushing, color unevenness, and cracks in dry coating film after outdoor exposure | 3 | — | 3 | 2 | 4 | — | 4 | 4 | 5 | 5 | 5 | — | 5 | 5 |
| Protective potential | 5 | — | 5 | 4 | 5 | — | 5 | 5 | 5 | 3 | 5 | — | — | — |
| Salt spray test — Rust | 5 | — | 5 | 5 | 5 | — | 5 | 5 | 5 | 2 | 5 | — | 4 | 5 |
| Salt spray test — Blistering, dissolution | 5 | — | 5 | 2 | 4 | — | 5 | 2 | 5 | 2 | 5 | — | 5 | 5 |
| Adhesion to solvent-type epoxy undercoating (bridge standard) | 4 | — | 5 | 4 | 4 | — | 5 | 4 | 5 | 4 | 5 | — | 5 | 5 |
| Secondary physical properties of film formed of solvent-type epoxy undercoating/middle coating (bridge standard) | 4 | — | 5 | 2 | 4 | — | 4 | 2 | 5 | 2 | 5 | — | 5 | 5 |

The invention claimed is:

1. A method for producing an aqueous inorganic zinc-rich coating composition, wherein the composition comprises a vehicle comprising an aqueous solution containing an alkali silicate represented by formula $M_2O \cdot nSiO_2$, wherein M represents Na, K, Li, or Cs, and n is a number of 2 to 4, at a concentration of 10 to 50 mass %, an ammonium ion at a concentration of 0.01 to 0.1 M, and a halide ion at a concentration of 0.01 to 1 M, and zinc powder, wherein the composition containing the vehicle and zinc powder in such amounts that when the composition is in the form of a dried film, the dried film has a binder solid content of 5 to 10 mass % and a zinc powder content of 90 to 95 mass %, said method comprising:

employing said vehicle comprising a neutralization product of a vehicle formed through partially neutralizing alkali silicate with an inorganic acid in an amount of 0.5 to 4.5 mass % with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass % with respect to the mass of the alkali silicate; and mixing the vehicle and the zinc powder.

2. The method for producing an aqueous inorganic zinc-rich coating composition according to claim 1, wherein n in the formula $M_2O \cdot nSiO_2$ is 2.5 to 4.

3. The method for producing an aqueous inorganic zinc-rich coating composition according to claim 1, wherein the zinc powder has a mean particle size of 5 to 8 μm.

4. The method for producing an aqueous inorganic zinc-rich coating composition according to claim 1, wherein the vehicle additionally contains a water-soluble polyhydric alcohol in an amount of 1 to 35 mass % with respect to the mass of the alkali silicate.

5. The method for producing an aqueous inorganic zinc-rich coating composition according to claim 1, wherein the vehicle additionally contains a water-soluble polyhydric alcohol in an amount of 1 to 35 mass % with respect to the mass of the alkali silicate.

6. A method for producing an aqueous inorganic zinc-rich coating composition wherein the composition comprises a vehicle comprising an aqueous solution containing an alkali silicate represented by formula $M_2O \cdot nSiO_2$, wherein M represents Na, K, Li, or Cs, and n is a number of 2 to 4, at a concentration of 10 to 50 mass %, an alkali halide in an amount of 0.5 to 13 mass % with respect to the mass of the alkali silicate, an ammonium ion at a concentration of 0.01 to 0.1 M, and a halide ion at a concentration of 0.01 to 1 M, and zinc powder, wherein the composition containing the vehicle and zinc powder in such amounts that when the composition is in the form of a dried film, the dried film has a binder solid content of 5 to 10 mass % and a zinc powder content of 90 to 95 mass %, said method comprising:

employing said vehicle comprising a neutralization product of a vehicle formed through partially neutralizing alkali silicate with an inorganic acid in an amount of 0.5 to 4.5 mass % with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass % with respect to the mass of the alkali silicate; and mixing the vehicle and the zinc powder.

7. The method for producing an aqueous inorganic zinc-rich coating composition according to claim 6, wherein n in the formula $M_2O \cdot nSiO_2$ is 2.5 to 4.

8. The method for producing an aqueous inorganic zinc-rich coating composition according to claim 6, wherein the zinc powder has a mean particle size of 5 to 8 μm.

9. The method for producing an aqueous inorganic zinc-rich coating composition according to claim 6, wherein the vehicle additionally contains a water-soluble polyhydric alcohol in an amount of 1 to 35 mass % with respect to the mass of the alkali silicate.

10. A method for producing an aqueous inorganic zinc-rich coating composition wherein the composition comprises a vehicle comprising an aqueous solution containing an alkali silicate represented by formula $M_2O \cdot nSiO_2$, wherein M represents Na, K, Li, or Cs, and n is a number of 2 to 4, at a concentration of 10 to 50 mass %, an ammonium ion at a concentration of 0.01 to 0.1 M, and a halide ion at a concentration of 0.01 to 1 M, zinc powder, and a pigment, wherein the composition in the form of dried film contains the vehicle and the pigment in such amounts that the composition has a binder solid content of 5 to 15 mass %, a pigment content of 5 to 55 mass %, and a zinc powder content of 40 to 90 mass %, said method comprising:

employing said vehicle comprising a neutralization product of a vehicle formed through partially neutralizing alkali silicate with an inorganic acid in an amount of 0.5 to 4.5 mass % with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass % with respect to the mass of the alkali silicate; and mixing the vehicle and the zinc powder.

11. A method for producing an aqueous inorganic zinc-rich coating composition wherein the composition comprises a vehicle comprising an aqueous solution containing an alkali silicate represented by formula $M_2O \cdot nSiO_2$, wherein M represents Na, K, Li, or Cs, and n is a number of 2 to 4, at a concentration of 10 to 50 mass %, an alkali halide in an amount of 0.5 to 13 mass % with respect to the mass of the alkali silicate, an ammonium ion at a concentration of 0.01 to 0.1 M, and a halide ion at a concentration of 0.01 to 1 M, zinc powder, and pigment, wherein the composition in the form of dried film contains the vehicle and the pigment in such amounts that the composition has a binder solid content of 5 to 15 mass %, a pigment content of 5 to 55 mass %, and a zinc powder content of 40 to 90 mass % said method comprising:

employing said vehicle comprising a neutralization product of a vehicle formed through partially neutralizing alkali silicate with an inorganic acid in an amount of 0.5 to 4.5 mass % with respect to the mass of the alkali silicate, and an aqueous viscous resin liquid formed through neutralizing a diluted polyacrylic acid emulsion with aqueous alkali metal hydroxide solution, wherein the vehicle contains the two ingredients in such amounts that the vehicle has a neutralized polyacrylic acid solid content of 0.5 to 3.5 mass % with respect to the mass of the alkali silicate; and mixing the vehicle and the zinc powder.

\* \* \* \* \*